United States Patent [19]

Court et al.

[11] 4,015,368
[45] Apr. 5, 1977

[54] DOOR OR PANEL SEAL

[75] Inventors: Charles T. Court, Texarkana; Jessie H. Milier, Wake Village, both of Tex.

[73] Assignee: Newcourt, Inc., Texarkana, Tex.

[22] Filed: Sept. 14, 1972

[21] Appl. No.: 288,956

[52] U.S. Cl. .................................. 49/488; 49/368; 49/489
[51] Int. Cl.[2] ......................................... E06B 7/23
[58] Field of Search ............ 49/368, 488, 479, 489, 49/495

[56] References Cited

UNITED STATES PATENTS

| | | | |
|---|---|---|---|
| 2,121,512 | 6/1938 | Shields | 49/488 |
| 2,163,566 | 6/1939 | Blessin | 49/488 X |
| 2,886,482 | 5/1959 | Huffman | 49/479 X |
| 2,935,771 | 5/1960 | Hatcher, Jr. | 49/489 X |
| 3,161,925 | 12/1964 | Bertolini | 49/368 |
| 3,518,792 | 7/1970 | Williamson et al. | 49/495 X |

*Primary Examiner*—Kenneth Downey
*Attorney, Agent, or Firm*—Arthur F. Zobal

[57] ABSTRACT

The specification discloses a two-piece peripheral channel gasket for a door or panel to provide a seal between the door and another door or a supporting frame. In the preferred embodiment, the channel gasket comprises a rigid channel member to be sealed to the door edge and having two spaced grooves facing away from each other for receiving two spaced connecting legs extending from a base of a flexible sealing gasket. The connecting legs extend from the plane of the base of the gasket and then inward toward each other. Each connecting leg includes an enlarged head extending from a smaller neck and having surfaces which taper toward a smaller end. Each receiving groove of the channel member has a smaller entrance portion which decreases in size to an enlarged holding zone for receiving the enlarged head of a connecting leg of the gasket. Due to the configuration of the connecting legs of the gasket and the grooves formed in the channel member, the connecting legs may be readily squeezed or pressed into the mating grooves of the channel member to securely hold the gasket once inserted.

37 Claims, 22 Drawing Figures

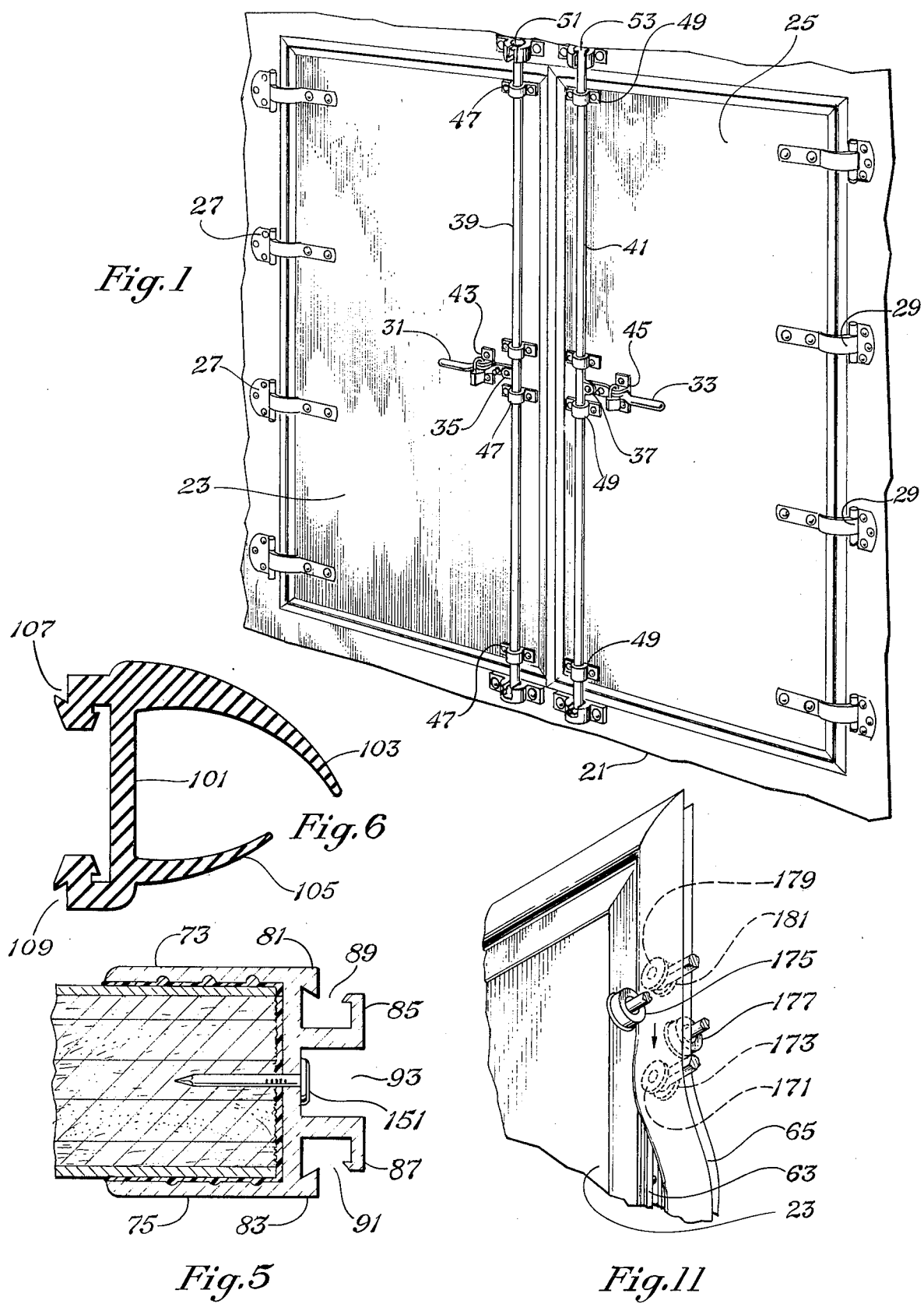

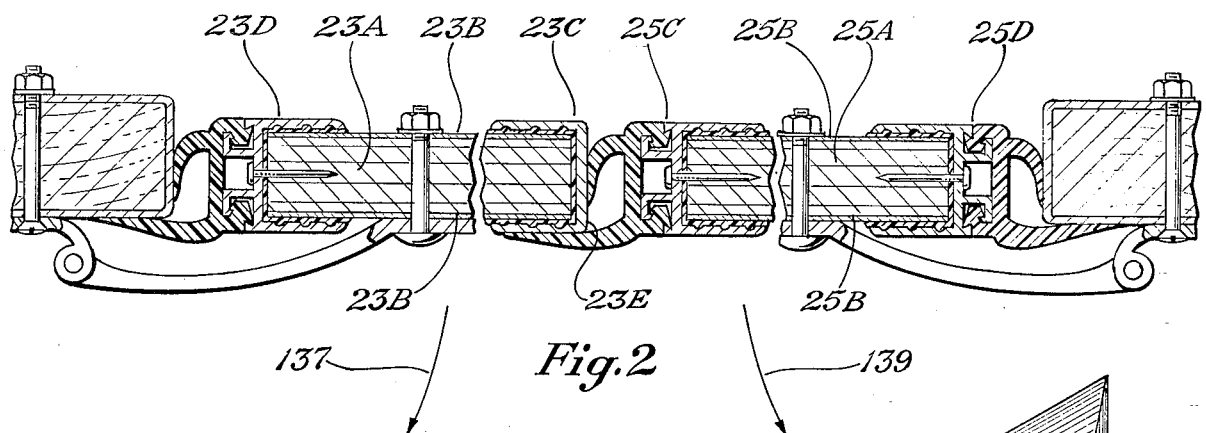
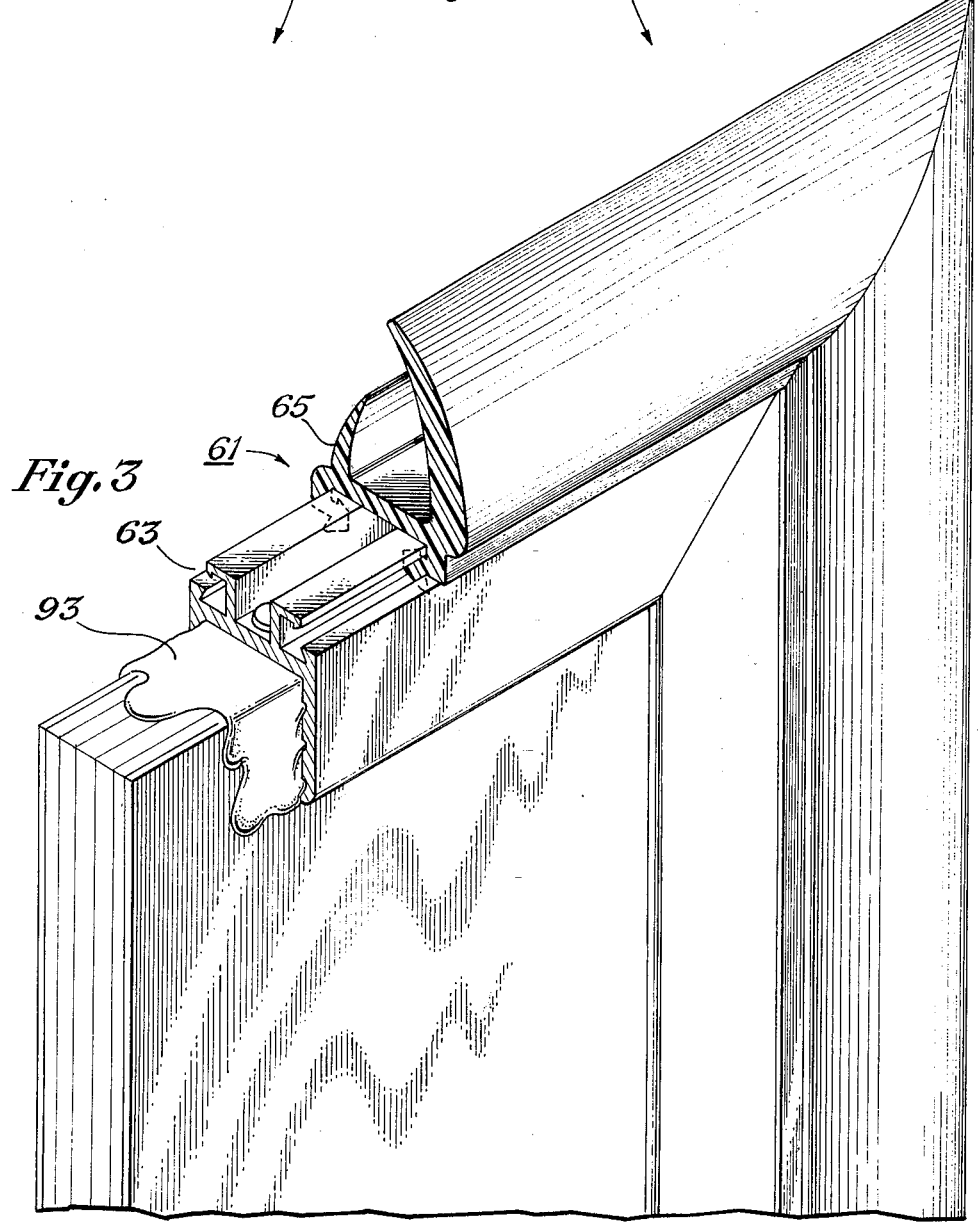

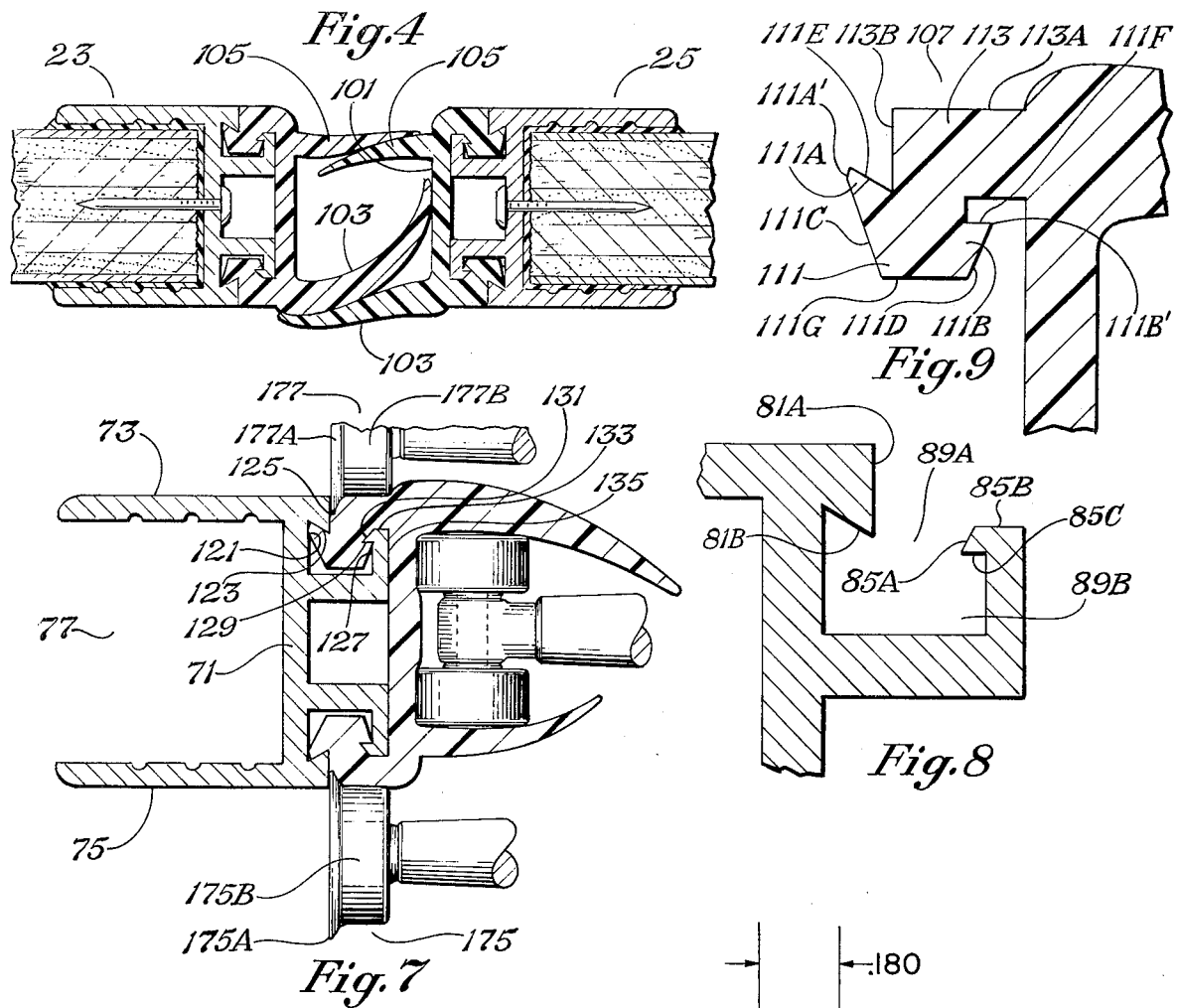

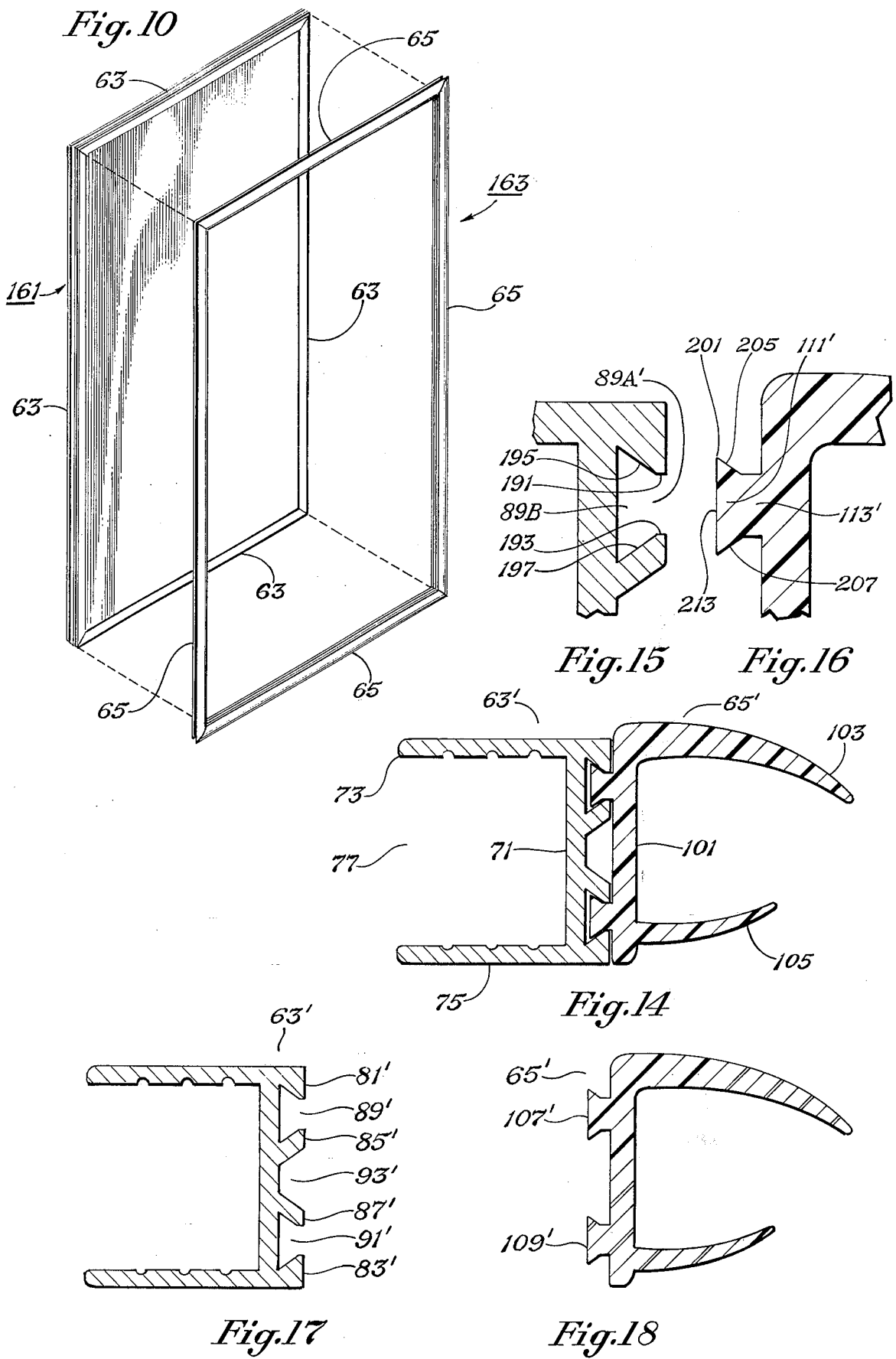

DOOR OR PANEL SEAL

BACKGROUND OF THE INVENTION

This invention relates to a channel gasket for a door or the like and which may be readily assembled and repaired.

A number of different types of gaskets or seals have been employed or proposed for use around the edges of doors to form a seal between the door and the surrounding frame or another door. The known seals employed or proposed however have disadvantages in that they do not form an adequate seal or else are difficult to assemble and repair.

For example one known type of gasket or seal comprises a channel member to be secured to the edge of the door and having T-shaped grooves in the outer face of the channel with entrances spaced inward from the outer edges thereof for receiving T-shaped connecting legs of a gasket. This channel gasket has disadvantages in that the connecting legs of the gasket must be laced or slid within the receiving grooves of the channel along the entire length of the channel. The mitered edges of the gasket thus must be fused together after the channel gasket sections are secured in place around the edges of the door. Fusion of the mitered edges of the gasket after assembly on the door is difficult and does not result in an effective seal between the mitered edges. Moreover even after the gasket has been inserted in place it is not securely held by the channel. Thus this type of channel gasket is difficult to assemble and repair and does not provide the seal desired.

SUMMARY OF THE INVENTION

It is an object of the present invention to provide a channel gasket for a door, panel, or the like and which is easy to assemble and repair and allows the mitered edges of the gasket to be effectively fused together. In addition there is provided a positive seal against moisture between the door and the channel member and between the channel member and the gasket.

In one aspect, the channel gasket of the present invention comprises a rigid channel member having spaced side members extending from one side of a base forming a groove for receiving an edge of the door. Structure on the other side of the base forms at least one receiving groove. A flexible sealing gasket is provided to be held by the channel member and includes a base with sealing means formed on one side thereof for forming a seal with another member. At least one connecting leg extends from the other side of the base of the flexible sealing gasket for insertion into the groove of the channel member. The connecting leg of the gasket in cross-section includes an enlarged head coupled to the base of the gasket by way of a smaller neck portion. The receiving groove in cross-section includes a smaller entrance portion which leads to an enlarged holding zone for receiving and holding the enlarged head of the connecting leg. The enlarged head of the connecting leg includes tapered portions adapted to be pressed through the smaller entrance portion and into the enlarged holding zone of the receiving groove and which act to hold the enlarged head in the enlarged holding zone after insertion therein.

In a further aspect, the gasket has two connecting legs to be held by two spaced receiving grooves formed in the channel member.

In one embodiment the enlarged heads of the connecting legs are formed by surfaces that flare outward toward an enlarged end.

In the preferred embodiment, each connecting leg comprises an enlarged head extending from the base of the gasket by way of a smaller neck and which tapers toward a smaller end. Each of the two spaced receiving grooves in the channel member in cross-section includes a smaller entrance portion which decreases in size inward and leads to an enlarged holding zone for receiving and holding one of the enlarged heads of the connecting legs. The entrance portion of each of the two spaced grooves in cross-section has a minimum width less than the normal maximum cross-sectional width of the enlarged head of the connecting legs.

In another aspect, the smaller entrance portions of the two spaced receiving grooves of the channel member are located on opposite ends of the base of the channel member and face generally outward and away from each other. The two connecting legs of the sealing gasket are located on opposite ends of the base of the sealing gasket and extend away from the plane of the base and then inward each other. This arrangement allows the connecting legs of the gasket to be securely held by the receiving grooves of the channel member.

The connecting legs of the sealing gasket may be squeezed or pressed in place into the mating grooves of the channel member. In addition an effective and two-way seal is provided between the channel member and the door and between the gasket and the channel member. Moreover since the gasket may be attached to the channel member by merely squeezing or pressing the connecting legs into their mating grooves, the gasket sections may have their mitered edges fused together effectively with special machinery prior to attachment to the channel members. Thus the channel members may be sealed to the edges of the door and the gasket sections fused together in a "frame" which then may be squeezed or pressed to the channel members secured in place around the edges of the door. Repair also is facilitated as will as described subsequently.

Brief Description of the Drawings

FIG. 1 illustrates a door assembly comprising two doors each of which have channel gaskets secured around the peripheral edges thereof;

FIG. 2 is a cross-sectional view of two doors illustrating channel gaskets secured to four edges of one door and secured to only three edges of the other door;

FIG. 3 is a partial cross-sectional side view of a door or panel incorporating the preferred channel gasket of the present invention;

FIG. 4 is a partial cross-sectional view of two doors each having channel gaskets secured to all four edges thereof;

FIG. 5 is a cross-sectional view of the channel member of FIG. 3 secured to the edge of a door;

FIG. 6 is a cross-sectional view of the gasket of FIG. 3;

FIG. 7 is a cross-sectional view of the gasket having its connecting legs squeezed or pressed into the grooves of the channel member and illustrating rollers to aid in the insertion process;

FIG. 8 is an enlarged cross-sectional view of one of the grooves of the channel member;

FIG. 9 is an enlarged cross-sectional view of one of the connecting legs of the gasket;

FIG. 10 illustrates a gasket formed in a rectangular picture frame prior to connection to the channel member sealed around the peripheral edges of a door;

FIG. 11 illustrates the rollers of FIG. 7 as used to insert the connecting legs of the gasket into the grooves of the channel member;

FIGS. 12 and 13 illustrate dimensions of the channel member and gasket of the present invention and suitable for use on a door or panel having a core thickness of ¾ of an inch;

FIGS. 14–18 are cross-sectional views of a modified channel gasket; and

DETAILED DESCRIPTION OF THE INVENTION

Figure 19:
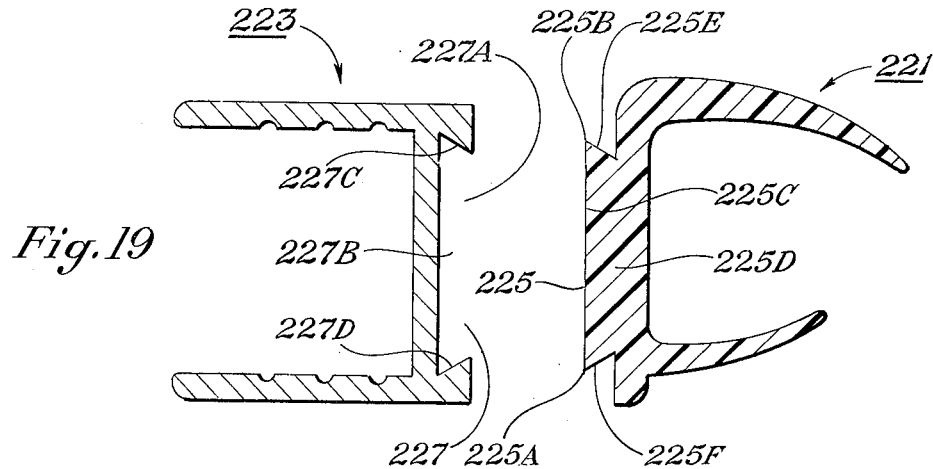
FIGS. 19–22 are cross-sectional views of two other types of channel gaskets.

Referring now to FIG. 1, there is illustrated a frame 21 having a pair of rectangular shaped doors 23 and 25 mounted thereto with hinges 27 and 29 to allow both of the doors to be swung between closed and open positions for closing and opening the entrance formed through the frame. The frame for example may be the rear of a conventional truck or a conventional container employed for shipping and hauling purposes. Handles 31 and 33 are employed for opening and closing the doors. They also operate a conventional locking mechanism to lock the doors to the frame 21 when they are closed. In this respect handles 31 and 33 are pivotally coupled to connections 35 and 37 which are connected to rotatable cam rods 39 and 41 respectively. Supports and locks 43 and 45 support the handles in the closed and locked positions. The cam rods are secured to the doors by brackets 47 and 49 which allow the rods to be rotated when the handles 31 and 32 are rotated. Coupled to the ends of the rods 37 and 39 are cams (not shown) which are adapted to work in keepers 51 and 53, secured to the frame 21, to lock and unlock the doors from the frame when the cam rods are rotated by the handles 31 and 33.

Referring to FIG. 2 each of the doors 23 and 25 are formed of a plywood core 23A and 25A, respectively and have a thin skin or sheet of metal sealed on opposite sides thereof for protection purposes. The thin sheets are illustrated at 23B and 25B. They may be of aluminum or steel or a combination thereof or may be formed of other desirable materials such as fiberglass.

Both doors have the channel gaskets of the present invention coupled to their peripheral edges to form a seal between the edges of the doors and the frame 21 and between the center on inner edges 23C and 25C of the doors when they are in a closed position. Referring to FIG. 3, the channel gasket of the preferred embodiment is identified at 61 and comprises a rigid channel member 63 connected and sealed to the peripheral edge of the door and a flexible and resilient sealing gasket 65 held by the channel member 63. The channel member 63 may be of aluminum while the gasket 65 may be of soft vinyl. In the embodiment of FIG. 2, the channel gasket 61 is secured around all for edges of the door 25 while the channel gasket 61 is secured only around three edges of the door 23. In the embodiments of FIGS. 1 and 4, the channel gasket is secured around all four edges of each of the doors 23 and 25 as will be described subsequently.

Referring to FIGS. 5, 7, and 8, the channel member 63 is U-shaped in configuration on one side and comprises a base 71 having two legs 73 and 75 extending from one side of the base forming a groove 77 for receiving the edge of the door. On the other side of the base 71 are two outer extensions 81 and 83 and two inner extensions 85 and 87 forming two spaced outer grooves 89 and 91 and a central groove 93. Grooves 89 and 91 face outward and away from each other. Referring to groove 89 in FIG. 8, it comprises a smaller entrance portion 89A which decreases in size inward and which leads to an enlarged holding zone 89B. The entrance 89A is formed by side walls 81A and 85A and 85B. As illustrated, wall 85A as well as wall 85B taper or angle inward with respect to wall 81A. Groove 91 is formed in a similar manner.

In assembling the channel member 63 to the edge of a door, a sealant and adhesive 93 (see FIG. 3) is applied between the three interior surfaces of the three side walls forming the groove 77 and the edge and side portions of the door to securely connect the channel member 63 to the door edge with a moistureproof seal to prevent moisture from reaching the wood plies of the plywood core of the door.

Referring to FIGS. 6 and 9, the gasket 65 comprises a base 101 having two inwardly curved sealing legs 103 and 105 extending from one side of the base for forming a seal with the frame and the center edge of the other door. Extending from the other side of the base 101 are two connecting legs 107 and 109 which are adapted to be squeezed or pressed into the grooves 89 and 91 for connecting the gasket 65 to the channel member 63. Each of the connecting legs 107 and 109 comprises an enlarged head coupled to the base 101 by way of a smaller neck. The enlarged head of each connecting legs has tapered surfaces of enabling the head to be squeezed or pressed through the smaller entrance and into the enlarged holding zone of one of the appropriate grooves formed in the channel member for locking the gasket to the channel member.

Referring to the connecting legs 107 in FIG. 9, its enlarged head is identified at 111 while its smaller neck is identified at 113. The neck 113 comprises portion 113A which extends outward perpendicular to the plane of the base 101 and a portion 113B which is perpendicular to portion 113A and parallel to the plane of the base 101. The enlarged head 11 comprises two barbs 111A and 111B having outwardly extending tapered or pointed edges 111a' and 111B'. The barbs and hence the enlarged head or defined by surfaces 111E and 111F and surfaces 111C and 111D the latter of which taper toward a smaller end portion 111G which faces inward toward the center portion of the base 101. Connecting leg 109 is constructed in a similar manner. Thus the tapered ends of the enlarged heads of the connecting legs face each other. Moreover they conform generally in shape with the enlarged holding zones of the grooves 89 and 91 of the channel member 63.

Since the enlarged heads of the connecting legs of the gasket 65 are tapered and are formed of flexible material, they may be squeezed or pressed, by hand or with rollers, through the decreasing entrances and into the enlarged holding zones of the mating grooves of the channel member. In the insertion process, the barbs 111A and 111B and their tapered edges 111A' and 111B' will be squeezed or flattened backward thereby allowing the head to be inserted through the smaller entrances. Once the legs of the gasket have been inserted in place, the enlarged heads of the connecting legs will resume their original shape within the receiving grooves. Surfaces 111E and 111F of the enlarged heads of the connecting legs will mate with surfaces 81B and 85C of the enlarged zones of the receiving grooves whereby the barbs of the connecting legs will securely hold the gasket to the channel member. The holding action is enhanced since the receiving grooves of the channel member 63 face generally outward away from each other while the enlarged barb-shaped heads of the connecting legs are turned inward and when inserted in place, the connecting legs wrap around the inner channel extensions 85 and 87 forming the grooves 89 and 91. Thus it is difficult to force or knock the gasket out of its grooves particularly by forces applied to the side of the gasket which will be experienced during the normal opening and closing operations of the door. Hence the gasket will remain secured in place to the channel member even after extensive useage of the door.

In addition, a moisture tight seal is established between the gasket 65 and the channel member 63 without the need of supplemental chemical sealants or mechanical fasteners. In this respect, referring to the connecting leg 107 and its mating groove in FIG. 7, an effective seal exist between a number of adjacent surface areas of the gasket and leg 107 and the wall structure of the channel member forming its mating groove. Effective sealing surfaces are illustrated at 121, 123, 125, 127, 129, 131, 133, and 135. Similar sealing surfaces exist between the other connecting leg 109 and the structure of the channel member forming its mating groove. Thus a dial moisture seal is provided since the channel member is sealed to the peripheral edge of the door while a moisture seal exists between a plurality of adjacent surfaces of the gasket and the channel member.

In the embodiment of FIG. 2, both doors 23 and 25 have the channel gaskets secured to their upper and lower edges and to their hinged edges 23D and 25B to form a seal between the door and the upper and lower edges of the adjacent frame and the side edges of the frame to which the doors are hinged. As illustrated in FIG. 2, in the closed position of the doors, the shorter legs 105 of the gasket are bent inward against the frame edge while the longer legs 103 overlap the adjacent edges of the frame. This also occurs between the upper and lower channel gaskets of the door and the upper and lower edges of the adjacent frame. The center or inner edge 25C of the door 25 also has a channel gasket secured thereto for forming a seal with a channel member or cap 23E secured and sealed to the center or inner edge 23C of the door 23 when both doors are closed.

In another embodiment, both doors will have channel gaskets coupled to all four edges thereof. In this embodiment, the channel gaskets coupled to the center or inner edges of the doors will interlock with each other when the doors are closed to form a seal as illustrated in FIG. 4.

The embodiment wherein both doors of a pair have the channel gaskets coupled to all four edges thereof, has advantages from a production standpoint since the personnel assembling the gaskets to the doors do not have to be concerned with whether the door is a "right" or "left" door. Thus assembly time and effort is minimized as well as inventory of the doors if the gaskets are assembled to all four edges of each door produced. Only when the hinges and locking mechanism are assembled to the doors one have to determine whether a given door is to be used as either a right or left door.

In assembling the channel gasket to four edges of a door, four channel sections and four gasket sections will be cut and mitered to the proper shape. Adhesive and sealant then will be applied to the interior bottom surfaces of the groove 77 of each channel member section which then will be fitted around the edge of the door. Once the channel is fitted in place, the sealant and adhesive will spread to other parts of the groove and adjoining door surfaces. Nails 151 (see FIG. 5) may be driven through the base 71 by way of the central groove 93 for temporarily holding the channel member in place around the edge of the door while the sealant and adhesive sets. Adhesive and sealant also will be applied between the mitered edges of the channel sections. A door with the channel members 63 connected and sealed to all four edges is illustrated at 161 in FIG. 10. After the adhesive and sealant have set, the gasket then will be squeezed or pressed in place to complete the assembly.

Preferably the four sections of the gasket will be fused together prior to assembly on the door to form a rectangular "picture frame" 163 which then will be attached to the channel members of the door 161 by squeezing or pressing the connecting legs into the receiving grooves of the channel members. In this manner, special machinery may be employed to fuse the mitered edges (cut at 45°) of the gaskets together with the proper amount of heat and pressure. Use of such machinery will allow a more effective seal to be obtained between the mitered edges than could be obtained if the mitered edges were sealed with heat by hand tools after the gasket sections were connected to the channel members. Thus by use of the special machinery to fuse the mitered gasket sections together in a "picture frame," a more effective, uniform and continuous gasket will be provided which will insure a solid seal against all outside elements. After the gasket sections have been fused into a "picture frame," it will then be connected to the channel members around the door. This will be accomplished by starting at one corner and squeezing the connecting legs into their mating grooves completely around the door assembly.

If a door is to be assembled which has channel gaskets connected to only three peripheral edges i.e. door 23 of FIG. 2, three channel members will be cut and mitered to shape and then connected and sealed to the three edges. The cap 23E also will be cut and sealed to the center or inner edge of the door. Three gasket sections will be cut and mitered to shape and then fused together with special machinery to form a C-shaped frame. The gasket sections fused in the C-shaped configuration then will be attached and connected to the channel members sealed around the three peripheral edges of the door.

Preferably rollers will be employed to insert the connecting legs of the gasket into the mating grooves of the channel member. Referring to FIGS. 7 and 11, the rollers provided for this purpose are identified as two forward rollers 171 and 173, two side edge rollers 175 and 177, and two rear rollers 179 and 181. The forward rollers 171 and 173 are employed to force the base of the gasket against the edge of the channel and to position the connecting legs next to their mating grooves. The side edge rollers 175 and 177 force the connecting legs into their grooves. In this respect, the side edge rollers 175 and 177 each have a rim 175A and 177A which force the gasket legs into their connecting grooves while the larger peripheral portions 175B and 177B hold the exterior portions of the gasket legs against the channel member. The rear rollers 179 and 181 are employed to provide additional force to insure that the gasket has been inserted in place.

In the event that a channel gasket becomes damaged, a partial or complete channel gasket replacement is possible on the door without destroying the door. For repair purposes, precut and mitered channel members will be provided as well as gasket sections pre-fused in the frame configuration desired. In addition, additional lengths of channel members and gasket sections will be provided for repair of small sections between the corners of a door.

In the event that the channel gasket becomes damaged at its corner, the complete channel gasket may be removed from the door and the door repaired by assembling and sealing precut and mitered channel members around the door edge. In the removal process, the gasket may be removed from the channel first by pulling the gasket outward with a hand tool such as vice grip pliers. Next the channel members may be removed by pulling outward with a suitable hand tool. The sealant and adhesive 93 and nails 151 employed to secure the channel members to the door edges will give and allow the channel members to be removed when sufficient outward force is applied thereto. After removal of the damaged channel gasket, the precut channel members may be fitted and sealed in place. The gasket sections pre-fused in the form of a "picture frame," or "C-shaped frame" then may be applied around the assembled channel members and attached by pressing or squeezing its connecting legs into their mating grooves in the channel member. In this manner repair may be carried out in the field without special machinery and yet still provide the desired seal at the mitered corners.

In the event that only a small portion of the channel gasket is damaged between its corners, repair may be carried out by taking a hacksaw and cutting out the damaged section of the channel gasket. A channel member then may be cut to the desired length and fitted and sealed in place. A gasket section also may be cut to the desired length and then pressed or squeezed into the receiving grooves of the channel member insert. The gasket insert then may be fused to the original gasket by the application of heat for example with a suitable hand tool which may be a thin strip of heated metal. As long as the gasket joints to be fused are not mitered corner joints, they may be fused effectively in place while on the door without the need of special machinery and equipment whereby repair on a small section between the corners can be carried out readily and effectively.

In the event that only the gasket is damaged, it may be removed without disturbing the door channel and replaced with the desired pre-fused gasket frame. Removal of the gasket may be carried out with a conventional hand tool such as vice grip pliers as indicated below.

Thus the present channel gasket has advantages in that it may be readily assembled and repaired effectively, and provides a two-way seal between the door and the channel and between the channel and the gasket. Moreover the gasket provides a continuous and uniform seal to insure a solid seal against all outside elements. In addition, the gasket will remain secured in place to the channel member even after extensive useage of the door.

In one embodiment, the channel member 61 preferably is formed of aluminium however it could be formed of other rigid material. The gasket 65 may be formed of polyvinyl chloride, neoprene, or other types of flexible gasketing material which can be extruded or molded and which is capable of being fused together preferably by the use of heat. Referring to FIGS. 12 and 13, the decimal numbers define the dimensions in inches of one embodiment of the channel member 63 and gasket 65 suitable for use on a door or panel having a core thickness of ¾ of an inch. It is to be understood that the channel member and gasket may have different dimensions for use on doors or panels having cores of various thicknesses.

Referring now to FIGS. 14–18, there is illustrated a modified channel 63' and gasket 65' to be connected to the edges of a door, panel, or the like. The channel 63' is similar to channel 63 in that it comprises two legs 73 and 75 extending from a base 71 to form a groove 77 to allow the channel to be fitted and sealed to the edge of a door or the like. In addition the gasket 65' is similar to gasket 65 in that it comprises two sealing legs 103 and 105 extending from a base 101.

Extending from the base 71 of the channel 63' are two outer extensions 81' and 83' and two inner extensions 85' and 87' to form two receiving grooves 89' and 91' and a central groove 93'. Referring to groove 89' in FIG. 15, it comprises a smaller entrance portion 89A' which leads to an enlarged holding zone 89B'. The entrance 89A' is formed by parallel side walls 191 and 193 while the holding zone 89B' is formed by side walls 195 and 197 which flare away from the smaller entrance portion. Groove 91' is constructed in a similar manner.

Referring to FIGS. 16 and 18, the gasket 65' has two connecting legs 107' and 109' extending perpendicular from the plane of the base 101. Each connecting leg comprises an enlarged head coupled to the base 101 by way of a smaller neck. Referring to the connecting leg 107' in FIG. 16, its enlarged head is identified at 111' while its smaller neck is identified at 113'. The enlarged head 111' comprises two outwardly extending tapered edges 201 and 203 defined by surfaces 205 and 207 respectively which flare outward from the neck toward a larger end 213. Connecting leg 109' is constructed in a similar manner. As illustrated in FIG. 14, the length of the connecting legs ar shorter than the depth of the grooves. The tapered edges 201 and 203 of the enlarged heads of the connecting legs are relatively flexible whereby the enlarged heads may be pressed or squeezed through the smaller entrance portions of the grooves and into the enlarged holding zones. In the insertion process, the tapered edges of the enlarged heads of the connecting legs will be squeezed or flattened backward. Since the depth of each of the grooves is greater than the length of the connecting legs, sufficient space will be provided to allow the connecting legs to be pressed into their mating grooves. After the enlarged heads have been inserted they will resume their original shape and surfaces 205 and 207 of each head will mate with surfaces 195 and 197 of each groove respectively to hold the connecting legs in place.

Thus, in the embodiment of FIGS. 14–18, the gasket sections may be cut and mitered to shape and their mitered edges properly sealed with special machinery, prior to connection to the channel members, to form the desired gasket frame. After the channel members are fitted and sealed to the edges of the door, the gasket frame formed then may be connected by pressing or squeezing its connecting leg into the receiving grooves of the assembled channel members. Insertion by pressing may be done by hand or with rollers.

Figure 20:
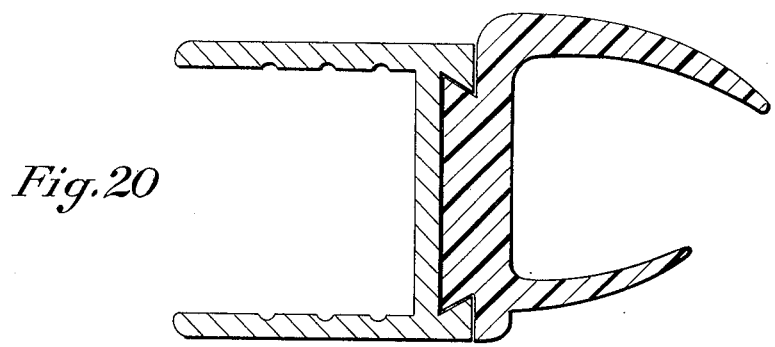

Instead of two connecting legs and receiving grooves, the gasket and channel member may have only one connecting leg and one receiving groove for holding the gasket to the channel member as illustrated by the modified gasket 221 and channel member 223 in FIGS. 19 and 20. In the embodiment of FIGS. 19 and 29, the single connecting leg is identified at 225 while the single receiving groove is identified at 227. The connecting leg 225 has two outwardly extending tapered edges 225A and 225B forming an enlarged head 225C and a smaller neck portion 225D. The receiving groove 227 comprises a smaller entrance portion 227A which leads to an enlarged holding zone 227B. The holding zone 227B is formed by side walls 227C and 227D which flare away from the smaller entrance portion. The depth of the groove 227 is greater than the length of the leg 225 as illustrated in FIG. 20. The connecting leg 225 may be squeezed or presses by hand or rollers into the receiving groove 227 for connection of the gasket 221 to the channel member 223. After the leg is squeezed into the receiving groove, the outward flaring surfaces 225E and 225F of the connecting leg will mate with the surfaces 227C and 227D forming the enlarged holding zone of the receiving groove.

Figure 21:
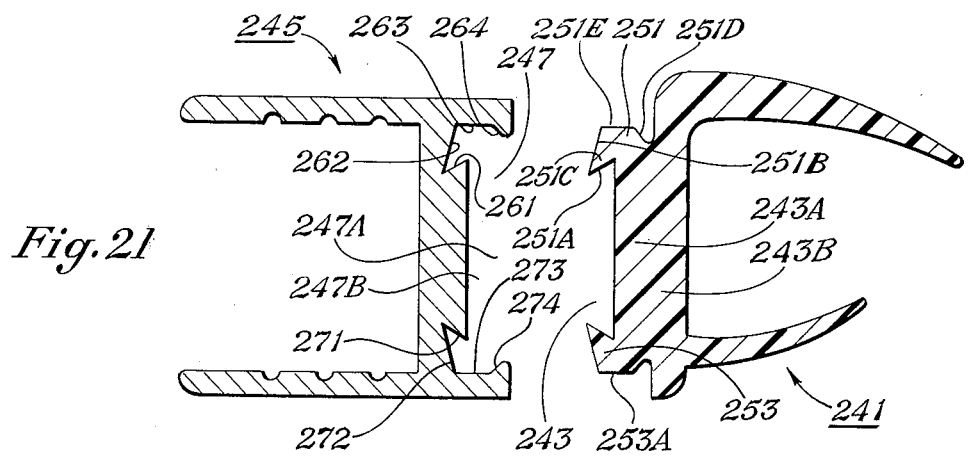
Figure 22:
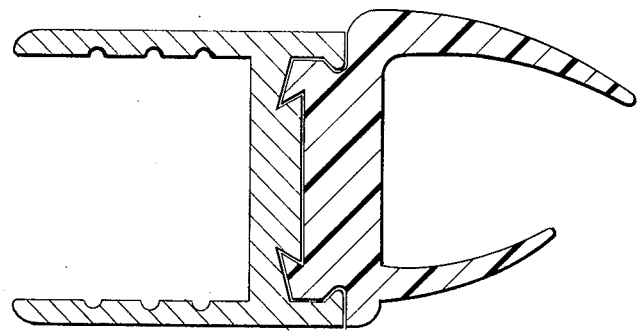

Referring now to FIGS. 21 and 22, there is illustrated another channel gasket comprising a gasket 241 having a single connecting leg 243 and a channel member 245 having a single receiving groove 247. The leg 243 may be defined as including an enlarged head portion 243A and a smaller neck portion 243B while the groove 247 may be defined as including a smaller entrance portion 247A leading to an enlarged holding zone 247B. The enlarged head portion 243A includes two heads 251 and 253 each of which has a smaller neck portion. Head 251 is formed by tapered surfaces 251A and 251B defining a barb or tapred edge 251c and tapered surface 251D which along with tapered surface 251B defines a smaller end 251E which faces outward. Head 253 is formed in a similar manner. Surfaces 261–264 and surfaces 271–274 of the main groove 247 define secondary grooves within the main groove and which conform with the shape of the heads 251 and 253. Each of the secondary grooves have smaller entrances. The connecting leg 243 may be pressed or squeezed by hand or rollers into the receiving groove 247 for connection of the gasket 241 to the channel member 243. In the insertion process the heads 251 and 253 will be pressed into their secondary grooves.

Since the gaskets of FIGS. 19–22 may be connected to their channel members by pressing or squeezing their connecting legs into the receiving grooves of their channel members, the mitered edges of the gasket sections may be fused together with special machinery to form the desired gasket frame prior to connection to the channel members. After the channel members have been fitted and sealed to the edges of the door or panel, the unitary gasket frame then may be connected by pressing its connecting leg by hand or rollers into the receiving grooves of the channel members assembled on the door or frame.

Thus the embodiments of FIGS. 14–22 have advantages in that assembly and repair is facilitated, however their gaskets will not be as securely held by their channel members as are the gaskets 65 of the channel gaskets of the preferred embodiment as disclosed in FIGS. 3, 5, and 6.

The gasket of the embodiment of FIGS. 21 and 22, however, will be held more securely by its channel member than will the gaskets of the embodiments of FIGS. 14–18 and 19 and 20.

We claim:
1. A peripheral channel gasket for a door, panel, or the like comprising:
   a rigid channel member having spaced side members extending from one side of a base forming a groove for receiving an edge of the door or panel,
   said one side of said base between said side members being substantially flat,
   each of said side members having a substantially flat surface which extends from said one side of said base to the opposite free end of said side member,
   said substantially flat surface of each side member forming an angle of about 90° with said one side of said base,
   structure formed on the other side of said base forming at least one receiving groove,
   a flexible sealing gasket to be held by said channel member and including a base with sealing means formed on one side thereof for forming a seal with another member,
   at least one connecting leg extending from the other side of said base of said gasket for insertion into said receiving groove of said channel member,
   said connecting leg in cross section including an enlarged head coupled to the base of the gasket by way of a smaller neck portion,
   said receiving groove in cross section including a smaller entrance portion which leads to an enlarged holding zone for receiving and holding said enlarged head of said connecting leg,
   the entrance portion of said receiving groove in cross section having a minimum width less than the normal maximum cross sectional width of the enlarged head of the connecting leg,
   said enlarged head of said connecting leg being constructed to allow it to be passed through the smaller entrance portion and into said enlarged holding zone of said receiving groove and which act to hold said enlarged head in said enlarged holding zone after insertion therein.

2. A peripheral channel gasket for a door, panel, or the like comprising:
   a rigid channel member having spaced side members extending from one side of a base forming a groove for receiving an edge of the door,
   said one edge of said base between said side members being substantially flat,
   each of said side members having a substantially flat surface which extends from said one side of said base to the opposite free end of said side member,
   said substantially flat surface of each side member forming an angle of about 90° with said one side of said base,
   structure formed on the other side of said base forming two spaced receiving grooves,
   a flexible sealing gasket to be held by said channel member and including a base with sealing means formed on one side thereof for forming a seal with another member, two connecting legs extending from the other side of said base of said gasket for insertion into said receiving grooves of said channel member, each connecting leg in cross section including an enlarged head coupled to the base of the gasket by way of a smaller neck, each of said two spaced receiving groves in cross section including a smaller entrance portion which leads to an enlarged holding zone for receiving and holding one of the enlarged heads of the connecting legs, the entrance portion of each of said two spaced receiving grooves in cross section having a minimum width less than the normal maximum cross sectional width of the enlarged heads of the connecting legs, each enlarged head of said connecting legs including tapered edges adapted to be pressed through the smaller entrance portion and into the enlarged holding zone of its mating receiving groove and which act to hold the enlarged head in the enlarged holding zone after insertion therein.

3. The peripheral channel gasket of claim 2 wherein the tapered edges of each enlarged head of said connecting legs are formed by surfaces that flare outward toward an enlarged end spaced from its neck.

4. The peripheral channel gasket of claim 3 wherein: the tapered edges of each enlarged head of said connecting legs are formed by surfaces that taper toward each other toward a smaller end spaced from its neck, said smaller entrance portion of each of said spaced receiving grooves decreases in size inward toward its enlarged holding zone.

5. The channel gasket of claim 3 wherein: said two spaced receiving grooves of said channel member are located on opposite ends of said other side of said base of said channel member, the entrance of each of said receiving grooves facing generally outward and away from each other, said two connecting legs of said sealing gasket are located on opposite ends of said other side of said base of said sealing gasket and extend from the base of said gasket and then inward toward each other.

6. The channel gasket of claim 5 wherein the neck of each of said connecting legs of said flexible sealing gasket extends generally perpendicular away from its base and then generally parallel to its base.

7. The channel gasket of claim 6 wherein the sealing means of said gasket comprises two spaced sealing legs extending from said one side of said base of said gasket.

8. A peripheral channel gasket for a door, panel, or the like comprising:

a rigid channel member having spaced side members extending from one side of a base forming a groove for receiving the edge of a door or panel, said one side of said base between said side members being substantially flat, each of said side members having a substantially flat surface which extends from said one side of said base to the opposite free end of said side member, said substantially flat surface of each side member forming an angle of about 90° with said one side of said base, structure formed on the other side of said base forming two spaced receiving grooves and which face generally outwardly and away from each other, a flexible sealing gasket to be held by said channel member and including a base with sealing means formed on one side thereof for forming a seal with another member, two connecting legs extending from the other side of said base of said sealing gasket for insertion into said two spaced receiving grooves of said channel member, each of said connecting legs including an enlarged head coupled to the base of said sealing gasket by way of a smaller neck, each enlarged head including an enlarged portion adjacent its neck and which extends toward a smaller end away from its neck, each connecting leg extending outward from the plane of the base of the gasket and then inward whereby the smaller ends of each enlarged head face generally toward each other, each of said two spaced receiving grooves in cross section including a smaller entrance portion leading to an enlarged holding zone for receiving and holding one of the enlarged heads of the legs, the entrance portion of each of said two spaced receiving grooves in cross section having a minimum width less than the normal maximum cross sectional width of the enlarged heads of the connecting legs of said gasket.

9. A door, panel, or the like having a peripheral channel gasket secured around a plurality of edges thereof, said channel gasket secured to each of said plurality of edges comprising:

a rigid channel member having spaced side members extending from on side of a base forming a groove fitted to an edge of the door or panel, said one side of said base between said side members being substantially flat, each of said side members having a substantially flat surface which extends from said one side of said base to the opposite free end of said side member, said substantially flat surface of each side member forming an angle of about 90° with said one side of said base, structure formed on the other side of said base forming at least one receiving groove, a flexible sealing gasket held by said channel member and including a base with sealing means formed on one side thereof for forming a seal with another member, at least one connecting leg extending from the other side of said base of said gasket and inserted into said receiving groove of said channel member, said connecting leg in cross section including a enlarged head coupled to the base of the gasket by way of a smaller neck portion, said receiving groove in cross section including a smaller entrance portion which leads to an enlarged holding zone for receiving and holding said enlarged head of said connecting leg, the entrance portion of said groove in cross section having a minimum width less than the normal maximum cross sectional width of the enlarged head of the connecting leg, said enlarged head including tapered portions adapted to be pressed through the smaller entrance portion and into said enlarged holding zone and which act to hold said enlarged head in said enlarged holding zone.

10. A door, panel, or the like having a peripheral channel gasket secured around a plurality of edges thereof, said channel gasket secured to each of said plurality of edges comprising:

a rigid channel member having spaced side members extending from one side of a base forming a groove fitted to an edge of the door or panel, said one side of said base between said side members being substantially flat, each of said side members having a substantially flat surface which extends from said one side of said base to the opposite free end of said side member, said substantially flat surface of each side member forming an angle of about 90° with said one side of said base, structure formed on the other side of said base forming two spaced receiving grooves, a flexible sealing gasket held by said channel member and including a base with sealing means formed on one side thereof for forming a seal with another member, two connecting legs extending from the other side of said base of said gasket and inserted into said two receiving grooves of said channel member, each connecting leg in cross section including an enlarged head coupled to the base of the gasket by way of a smaller neck portion, each of said two spaced receiving grooves in cross section including a smaller entrance portion which leads to an enlarged holding zone for receiving and holding one of the enlarged heads of said connecting legs, the entrance portion of each of said two spaced receiving grooves in cross section having a minimum width less than the normal maximum cross sectional width of the enlarged heads of the connecting legs, each enlarged head including tapered edges adapted to be pressed through the smaller entrance portion and into the enlarged holding zone of its mating receiving groove and which act to hold the enlarged head in the enlarged holding zone after inserted therein.

11. The door or panel of claim 9 wherein:

said door or panel has two side edges, a top edge and a bottom edge, one of said channel gaskets being secured to one of said side edges, to said top edge and to said bottom edge, a rigid channel member of a cap means secured to the other of said side edges of said door or panel, said rigid channel member of said cap means having:
side members extending from one side of a base forming a groove for receiving an edge of the door or panel, said one side of said base between said side members being substantially flat, each of said side members having a substantially flat surface which extends from said one side of said base to the opposite said free end of said side member, said substantially flat surface of each side member forming an angle of about 90° with said one side of said base, said channel members fitted to adjacent edges of said door or panel having their ends mitered and joined together.

12. The door or panel of claim 9 wherein:

said door or panel has two side edges, a top edge and a bottom edge, one of said channel gaskets being secured to each of said side edges, to said top edge and to said bottom edge, said channel members fitted to adjacent edges of said door or panel having their ends mitered and joined together.

13. The door or panel of claim 12 wherein:

said door or panel has two side edges, a top edge and a bottom edge, one of said channel gaskets being secured to one of said side edges, to said top edge and to said bottom edge, a rigid channel member of a cap means secured to the other of said side edges of said door or panel, said rigid channel member of said cap means having:
side members extending from one side of a base forming a groove for receiving an edge of the door or panel, said one side of said base between said side members being substantially flat, each of said side members having a substantially flat surface which extends from said one side of said base to the opposite said free end of said side member, said substantially flat surface of each side member forming an angle of about 90° with said one side of said base, said channel members fitted to adjacent edges of said door or panel having their ends mitered and joined together.

14. The door or panel of claim 12 wherein:

said door or panel has two side edges, a top edge and a bottom edge, one of said channel gaskets being secured to each of said side edges, to said top edge and to said bottom edge, said channel members fitted to adjacent edges of said door or panel having their ends mitered and joined together.

15. A channel member to be secured to the edge of a door, panel, or the like for holding a flexible gasket comprising:

a rigid member having spaced side members extending from one side of the base forming a groove for receiving the edge of a door or a panel, said one side of said base between said side members being substantially flat, each of said side members having a substantially flat surface which extends from said one side of said base to the opposite free end of said side member, said substantially flat surface of each side member forming an angle of about 90° with said one side of said base, structure formed on the other side of said base forming two spaced receiving grooves and which face generally outward and away from each other, each of said two spaced receiving grooves in cross section including a smaller entrance portion which leads to an enlarged holding zone for receiving and holding a connecting leg of said gasket, said smaller entrance portion of each of said spaced receiving grooves decreasing in size inward toward its enlarged holding zone.

16. A door, panel, or the like for use on a truck container, or the like and having a first side facing the inside of the truck or container when in a closed position, said door or panel having a peripheral channel gasket secured to at least one edge thereof, said channel gasket comprising:

a rigid channel member having spaced side members extending from one side of a base forming a U-shaped configuration defining a groove into which an edge of the door or panel is fitted, one of said side members being located next to said first side of said door or panel, and the other of said side members being located next to the other side of said door or panel, structure formed on the other side of said base forming at least one receiving groove, a flexible sealing gasket held by said channel member and including a base with two spaced sealing legs of different lengths formed on one side thereof for forming a seal with another member, at least one connecting leg extending from the other side of said base of said gasket and inserted into said receiving groove of said channel member.

said connecting leg in cross-section including an enlarged head coupled to the base of the gasket by way of a smaller neck portion, said receiving groove in cross-section including a smaller entrance portion which leads to an enlarged holding zone for receiving and holding said enlarged head of said connecting leg, the entrance portion of said groove in cross-section having a minimum width less than the normal maximum cross-sectional width of the enlarged head of the connecting leg, said enlarged head including tapered portions adapted to be pressed through the smaller entrance portion and into said enlarged holding zone and which act to hold said enlarged head in said enlarged holding zone, said sealing gasket having its shorter sealing leg located next to said first side of said door or panel and having its longer sealing leg located next to the other side of said door or panel, said shorter sealing leg being spaced inward from the edge of the base of said gasket and said gasket, in its normal position, having no portion located or projecting beyond said one side member of said channel member.

17. A door, panel, or the like for use on a truck, container, or the like and having a first side facing the inside of the truck or container when in a closed position, said door or panel having a peripheral channel gasket secured to at least one edge thereof, said channel gasket comprising:

a rigid channel member having spaced side members extending from one side of a base forming a groove into which an edge of the door or panel is fitted, one of said side members being located next to said first side of said door or panel and the other of said side members being located next to the other side of said door or panel, structure formed on the other side of said base forming two spaced receiving grooves, a flexible sealing gasket to be held by said channel member and including a base with two spaced sealing legs of different lengths formed on one side thereof for forming a seal with another member, two connecting legs extending from the other side of said base of said gasket for insertion into said receiving grooves of said channel member, each connecting leg in cross-section including an enlarged head coupled to the base of the gasket by way of a smaller neck, each of said two spaced receiving grooves in cross-section including a smaller entrance portion which leads to an enlarged holding zone for receiving and holding one of the enlarged heads of the connecting legs, the entrance portion of each of said two spaced receiving grooves in cross-section having a minimum width less than the normal maximum cross-sectional width of the enlarged heads of the connecting legs, each enlarged head of said connecting legs including tapered edges adapted to be pressed through the smaller entrance portion and into the enlarged holding zone of its mating receiving groove and which act to hold the enlarged head in the enlarged holding zone after insertion therein, said sealing gasket having its shorter sealing leg located next to said first side of said door or panel and having its longer sealing leg located next to the other side of said door or panel, said shorter sealing leg being spaced inward from the edge of the base of said gasket and said gasket, in its normal position, having no portion located or projecting beyond said one side member of said channel member.

18. A door, panel, or the like for use on a truck, container, or the like and having a first side facing the inside of the truck or container when in a closed position, said door or panel having a peripheral channel gasket secured to at least one edge thereof, said channel gasket secured to said edge comprising:

a rigid channel member having spaced side members extending from one side of a base forming a groove fitted and sealed to an edge of the door or panel, structure formed on the other side of said base forming two spaced receiving grooves and which face generally outward and away from each other, a flexible sealing gasket held by said channel member and including a base with sealing means formed on one side thereof for forming a seal with another member, two connecting legs extending from the other side of said base of said gasket and inserted into said two receiving grooves of said channel member, each connecting leg in cross-section including an enlarged head coupled to the base of the gasket by way of an L-shaped neck portion, said L-shaped necks having first portions extending from the plane of the base of the gasket and second portions which extend toward each other, each enlarged head having two surfaces which taper toward a smaller end away from its neck, said enlarged heads being connected to said second portions of said L-shaped necks whereby the smaller ends of said enlarged heads face each other, each of said two spaced receiving grooves in cross-section including a smaller entrance portion which leads to an enlarged holding zone for receiving and holding one of the enlarged heads of said connecting legs, the entrance portion of each of said two spaced receiving grooves in cross-section having a minimum width less than the normal maximum cross-sectional width of the enlarged heads of the connecting legs,
each enlarged head including tapered edges adapted to be pressed through the smaller entrance portion and into the enlarged holding zone of its mating receiving groove and which act to hold the enlarged head in the enlarged holding zone after inserting therein.

19. The channel gasket of the door or panel of claim 18 wherein:
the maximum distance between said L-shaped necks of said connecting legs is about equal to the maximum distance between said spaced side members of said channel member whereby the outer surfaces of said connecting legs are about flush with the outer surfaces of said side members of said channel member when said connecting legs are inserted into said receiving grooves.

20. A gasket frame to be held by channel members secured to a plurality of edges of a rectangular shaped door or panel comprising:
a plurality of flexible sealing gasket sections having their edges mitered and fused together to form a configuration having at least one right angle,
each gasket section including:
a base with sealing means formed on one side thereof for forming a seal with another member,
two spaced connecting legs extending from the other side of said gasket section for insertion into two spaced receiving grooves formed in the channel members and which receiving grooves each have a smaller entrance portion leading to an enlarged holding zone,
each of said connecting legs in cross-section including an enlarged head coupled to the base of the gasket by way of an L-shaped neck,
said L-shaped necks having first portions extending from the plane of said base and second portions which extend toward each other,
each enlarged head of each connecting leg having tapered edges and having surfaces which taper toward each other toward a smaller end spaced from its neck,
said enlarged heads being connected to said second portions of said L-shaped necks whereby the smaller ends of said enlarged heads face generally toward each other.

21. The gasket frame of claim 20 wherein:
the enlarged head of each connecting leg comprises:
two pointed edges spaced rearward from said smaller end and defined by the intersection of said tapered surfaces with rear surfaces respectively which extend from said second portion of said L-shaped neck,
the outward rear surface located on the outward side of said second portion extending rearward at an acute angle relative to the outward side of said second portion.

22. The gasket frame of claim 20 wherein said gasket frame has a C-shaped configuration and is formed by three flexible sealing gasket sections having their edges mitered and fused together.

23. The gasket frame of claim 20 wherein said gasket frame has a rectangular shaped configuration formed by four flexible sealing gasket sections having their edges mitered and fused together.

24. A flexible gasket to be held by a channel member to be secured to an edge of a door, panel, or the like, said gasket comprising:
a base with sealing means formed on one side thereof for forming a seal with another member,
two spaced connecting legs extending from the other side of said base for insertion into two spaced receiving grooves of the channel member,
each of said connecting legs including an enlarged head coupled to said base by way of an L-shaped neck,
said L-shaped necks having first portions extending from the plane of said base and second portions which extend toward each other,
each enlarged head including tapered edges and having surfaces which taper toward each other toward a smaller end spaced from its neck,
said enlarged heads being connected to said second portions of said L-shaped necks whereby the smaller ends of said enlarged heads face generally toward each other.

25. The gasket of claim 24 wherein:
the enlarged head of each connecting leg comprises:
two pointed edges spaced rearward from said smaller end and defined by the intersection of said tapered surfaces with rear surfaces respectively which extend from said second portion of said L-shaped neck,
the outward rear surface located on the outward side of said second portion extending rearward at an acute angle relative to the outward side of said second portion.

26. The gasket of claim 25 wherein the inward rear surface located on the inward side of said second portion extends from said second portion at an angle of about 90°.

27. A channel member to be secured to the edge of a door, panel, or the like for holding a flexible gasket, comprising:
a rigid member having spaced side members extending from one side of a base forming a groove for receiving the edge of a door or a panel,
structure formed on the other side of said base forming two spaced receiving grooves and which face generally outward and away from each other,
each receiving groove being formed by an outer extension and an inward spaced extension extending from the opposite side of said base,
said inward spaced extensions extending from said opposite side beyond said outer extensions and spaced inward from the outer side edges of said outer extensions,
said two inward spaced extensions having portions extending outward from the plane of said base; away from each other; and then back toward said base,
each of said two spaced receiving grooves in cross-section including a smaller entrance portion which leads to an enlarged holding zone for receiving and holding a connecting leg of said gasket,
said smaller entrance portion of each of said spaced receiving grooves decreasing in size inward toward its enlarged holding zone.

28. The channel member of claim 27, wherein:
each of said outer extensions of said channel member has a flat forward surface generally parallel with the plane of said base and a return surface extending from said flat surface back to said base at an acute angle relative to said base, said flat surface and said return surface being adapted to engage the outward side and said outward rear surface of a connecting leg when inserted within its receiving groove.

29. A peripheral channel gasket for a door, panel, or the like, comprising:

a rigid channel member having spaced side members extending from one side of a base forming a groove for receiving the edge of a door or panel, structure formed on the other side of said base forming two spaced receiving grooves and which face generally outward and away from each other, each receiving groove being formed by an outer extension and an inward spaced extension extending from the opposite side of said base, said inward spaced extensions extending from said opposite side beyond said outer extensions and spaced inward from the outer side edges of said outer extensions, said two inward spaced extensions having portions extending outward from the plane of said base; away from each other; and then back toward said base, a flexible sealing gasket to be held by said channel member and including a base with sealing means formed on one side thereof for forming a seal with another member, two connecting legs extending from the other side of said base of said sealing gasket for insertion into said two spaced receiving grooves of said channel member, each of said connecting legs including an enlarged head coupled to the base of said sealing gasket by way of an L-shaped neck, said L-shaped necks having first portions extending from the plane of the base of the gasket and second portions which extend toward each other, each enlarged head having two surfaces which taper toward a smaller end away from its neck, said enlarged heads being connected to said second portions of said L-shaped necks whereby the smaller ends of said enlarged heads face generally toward each other, the distance between the outer side edges of said first portions of the legs of said gasket being about equal to the distance between the outer side edges of said outer extensions of said channel member, each of said two spaced receiving grooves in cross-section includes a smaller entrance portion leading to an enlarged holding zone for receiving and holding one of the enlarged heads of the legs, the entrance portion of each of said two spaced receiving grooves in cross-section having a minimum width less than the normal maximum cross sectional width of the enlarged head of the connecting legs of said gasket.

30. The channel gasket of claim 29 wherein:

the enlarged head of each connecting leg comprises:
two pointed edges spaced rearward from said smaller end and defined by the intersection of said tapered surfaces with rear surfaces respectively which extends from said second portion of said L-shaped neck, the outward rear surface located on the outward side of said second portion extending rearward at an acute angle relative to the outward side of said second portion.

31. The channel gasket of claim 30 wherein said inward rear surface of each connecting leg located on the inward side of said second portion extends from said second portion at an angle of about 90°.

32. The channel gasket of claim 30 wherein:

each of said outer extensions of said channel member has a flat forward surface generally parallel with the plane of said base and a return surface extending from said flat surface back to said base at an acute angle relative to said base, said flat surface and said return surface being adapted to engage the outward side and said outward rear surface of a connecting leg when inserted within its receiving groove.

33. The channel gasket of claim 32 wherein:

said channel member is attached and sealed to the edge of a door or panel to be used on a truck, container, or the like, said gasket having its connecting legs inserted in said receiving grooves of said channel member.

34. The channel gasket of claim 33 wherein:

said sealing means of said channel gasket comprises two spaced sealing legs of different lengths extending from said one side of said base, the shorter of said sealing legs being spaced inward from the edge of said base, said gasket being connected to said channel member in a manner to locate the shorter of said sealing legs on the side of the door or panel which will face the inside of the truck or container when in a closed position.

35. A peripheral channel gasket for a door, panel, or the like, comprising:

a rigid channel member having spaced side members extending from one side of a base forming a groove for receiving the edge of the door or panel, structure formed on the other side of said base forming a receiving groove means, a flexible sealing gasket to be held by said channel member and including a base with sealing means formed on one side thereof for forming a seal with another member, connecting leg means extending from the other side of said base of said sealing gasket for insertion into said receiving groove means of said channel member, said connecting leg means comprising two spaced enlarged head portions, each of which has a smaller neck portion, each enlarged head portion being formed by first and second surfaces which taper toward a smaller end generally facing one of the edges of said base whereby said smaller ends of said enlarged head portions face outward and away from each other, said first tapered surfaces of said enlarged head portions facing in a direction generally opposite said one side of said base of said sealing gasket, and a dove-tailed slot formed in said connecting leg means and extending from said first tapered surfaces toward said one side of said base of said sealing gasket defining barbs or pointed edges on said enlarged head portions facing generally each other, said receiving groove means of said rigid channel members conforming with the shape of said connecting leg means of said gasket.

36. A flexible gasket to be held by a channel member to be secured to the edge of a door, panel, or the like, said gasket comprising:
- a base with sealing means formed on one side thereof for forming a seal with another member,
- connecting leg means extending from the other side of said base of said sealing gasket for insertion into a receiving groove means of the channel member,
- said connecting leg means comprising two spaced enlarged head portions, each of which has a smaller neck portion,
- each enlarged head portion being formed by first and second surfaces which taper toward a smaller end generally facing one of the edges of said base whereby said smaller ends of said enlarged head portions face outward and away from each other,
- said first tapered surfaces of said enlarged head portions facing in a direction generally opposite said one side of said base, and
- a dove-tailed slot formed in said connecting leg means and extending from said first tapered surfaces toward said one side of said base of said sealing gasket defining barbs or pointed edges on said enlarged head portions facing generally each other.

37. A channel member to be secured to the edge of the door, panel, or the like, for holding a flexible gasket, comprising:
- a rigid member having spaced side members extending from one side of a base forming a groove for receiving the edge of a door or panel,
- structure including two spaced wall members extending from the other side of said base defining a receiving groove having two enlarged holding zones on opposite edges of the receiving groove for receiving connecting leg means of a gasket,
- said wall members including sidewall structure and portions extending inward from the sidewall structure thereof defining a smaller opening for said groove,
- each enlarged holding zone being adjacent to one of said wall members and being formed by a first surface on said base in said receiving groove and a second inward facing surface on the inward extending portion of its adjacent wall member which taper toward a third surface formed on the sidewall of its wall member, and
- a dove-tailed extension in said receiving groove extending from said first tapered surfaces toward the opening of said receiving groove and terminating short of the opening of said receiving groove.

* * * * *